(12) United States Patent
Pretty (10) Patent No.: US 11,427,341 B2
(45) Date of Patent: Aug. 30, 2022

(54) LINKAGE SUPPORTING A DOOR OF AN AIRCRAFT PROPULSION SYSTEM

(71) Applicant: Rohr, Inc., Chula Vista, CA (US)

(72) Inventor: Sean Pretty, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 45 days.

(21) Appl. No.: 17/038,581

(22) Filed: Sep. 30, 2020

(65) Prior Publication Data

US 2021/0094696 A1 Apr. 1, 2021

Related U.S. Application Data (60) Provisional application No. 62/914,864, filed on Oct. 14, 2019, provisional application No. 62/907,844, filed on Sep. 30, 2019.

(51) Int. Cl.

| *F01D 25/24* | (2006.01) |
|---|---|
| *F04D 29/52* | (2006.01) |
| *B64D 29/08* | (2006.01) |
| *B64D 29/06* | (2006.01) |

(52) U.S. Cl.
CPC ............. *B64D 29/06* (2013.01); *B64D 29/08* (2013.01); *F01D 25/24* (2013.01); *F04D 29/52* (2013.01); *F05D 2220/32* (2013.01); *F05D 2240/14* (2013.01)

(58) Field of Classification Search
CPC ......... B64D 29/06; B64D 29/08; F01D 25/24; F04D 29/52; F05D 2220/32; F05D 2230/72; F05D 2240/14
See application file for complete search history.

(56) References Cited

U.S. PATENT DOCUMENTS

| 4,174,609 | A | 11/1979 | Legrand |
| 4,385,423 | A | 5/1983 | Vermilye |
| 4,679,750 | A | 7/1987 | Burhans |
| 4,683,717 | A | 8/1987 | Naud |
| 9,003,770 | B2 | 4/2015 | Caruel |
| 9,221,545 | B2 | 12/2015 | Popescu |
| 9,650,917 | B2 | 5/2017 | Stewart |
| 9,885,253 | B2 | 2/2018 | Soria |
| 2004/0068978 | A1 | 4/2004 | Lair |
| 2013/0259641 | A1* | 10/2013 | Stewart ................... F01D 25/24 |
| | | | 415/1 |
| 2014/0319269 | A1* | 10/2014 | Scarr ...................... B64D 29/06 |
| | | | 244/54 |
| 2015/0121895 | A1 | 5/2015 | Suciu |
| 2015/0275766 | A1 | 10/2015 | Kohlenberg |
| 2016/0363097 | A1 | 12/2016 | Foutch |

(Continued)

FOREIGN PATENT DOCUMENTS

| GB | 2483908 B | 7/2012 |
| WO | 2019129961 A1 | 7/2019 |

OTHER PUBLICATIONS

EP search report for EP20199242.7 dated Feb. 25, 2021.

*Primary Examiner* — Igor Kershteyn
(74) *Attorney, Agent, or Firm* — Getz Balich LLC (57) ABSTRACT

An assembly is provided for an aircraft propulsion system. This assembly includes an inner cowl door, an outer cowl door and a flexible linkage. The outer cowl door is radially outboard of and overlaps the inner cowl door. The flexible linkage is configured to connect to and thereby link the inner cowl door and the outer cowl door.

17 Claims, 13 Drawing Sheets

(56) References Cited

U.S. PATENT DOCUMENTS

| | | | |
|---|---|---|---|
| 2018/0017020 A1* | 1/2018 | Howarth | F02K 1/06 |
| 2018/0142624 A1* | 5/2018 | Song | B64D 29/06 |
| 2018/0171664 A1 | 6/2018 | Frommer | |
| 2018/0362173 A1 | 12/2018 | Delaney | |
| 2019/0048824 A1* | 2/2019 | Calder | F02K 1/763 |
| 2019/0257269 A1 | 8/2019 | Rambaud | |
| 2021/0094697 A1* | 4/2021 | Pretty | B64D 29/06 |
| 2021/0269168 A1* | 9/2021 | Shaner | B64C 7/02 |
| 2021/0316872 A1* | 10/2021 | Lacko | B64D 29/06 |

* cited by examiner

LINKAGE SUPPORTING A DOOR OF AN AIRCRAFT PROPULSION SYSTEM

CROSS-REFERENCE TO RELATED APPLICATIONS

This application claims priority to U.S. Provisional Patent Application No. 62/907,844 filed Sep. 30, 2019 and to U.S. Provisional Patent Application No. 62/914,864 filed Oct. 14, 2019, each of which is hereby incorporated herein by reference in its entirety.

BACKGROUND

1. Technical Field

This disclosure relates generally to an aircraft propulsion system and, more particularly, to operatively linking at least one movable component to another component of the aircraft propulsion system.

2. Background Information

A modern aircraft propulsion system includes a nacelle for housing a gas turbine engine. The nacelle may include various cowl doors, which doors are pivotally mounted to provide access to the gas turbine engine and/or accessories configured with the gas turbine engine. While known nacelles and cowl doors have various advantages, there is still room in the art for improvement.

SUMMARY OF THE DISCLOSURE

According to an aspect of the present disclosure, an assembly is provided for an aircraft propulsion system. This aircraft propulsion system assembly includes an inner cowl door, an outer cowl door and a flexible linkage. The outer cowl door is radially outboard of and overlaps the inner cowl door. The flexible linkage is configured to connect to and thereby link the inner cowl door and the outer cowl door.

According to another aspect of the present disclosure, another assembly is provided for an aircraft propulsion system. This aircraft propulsion system assembly includes a nacelle inner structure, a nacelle outer structure and a flexible linkage. The nacelle inner structure includes an inner structure component. The inner structure component is configured to pivot between an inner structure component closed position and an inner structure component open position. The nacelle outer structure extends circumferentially about and overlaps the nacelle inner structure. The nacelle outer structure includes an outer structure component. The outer structure component is configured to pivot between an outer structure component closed position and an outer structure component open position. The flexible linkage extends between and is connected to the inner structure component and the outer structure component.

According to still another aspect of the present disclosure, another assembly is provided for an aircraft propulsion system. This aircraft propulsion system assembly includes a fixed structure, a nacelle inner structure, a nacelle outer structure and a flexible linkage. The nacelle inner structure includes an inner structure component. The inner structure component is configured to pivot between a closed position and an open position. The nacelle outer structure extends circumferentially about and overlaps the nacelle inner structure. The nacelle outer structure includes an outer structure component. The outer structure component is configured to pivot between a closed position and an open position. The flexible linkage extends between and is connected to the fixed structure and at least one of the inner structure component or the outer structure component.

The aircraft propulsion system assembly may also include a second flexible linkage extending between and connected to the inner structure component and the outer structure component.

The flexible linkage may be configured as or otherwise include a strap.

The flexible linkage may be configured as or otherwise include fabric.

The flexible linkage may be configured as or otherwise include a tether.

The aircraft propulsion system assembly may also include a fixed structure. The inner cowl door may be pivotally connected to the fixed structure. The outer cowl door may be pivotally connected to the fixed structure.

The fixed structure may be configured as an upper fixed structure.

The flexible linkage may be configured to pull against and thereby open the inner cowl door as the outer cowl door is opened.

The flexible linkage may be connected to the inner cowl door at an inner point. The flexible linkage may be connected to the outer cowl door at an outer point. A distance between the inner point and the outer point may change during at least a portion of movement of the outer cowl door between a closed position and an open position.

The flexible linkage may be configured to enable movement of the outer cowl door before movement of the inner cowl door.

The aircraft propulsion system assembly may also include an actuator configured to move the outer cowl door from a closed position to an open position.

The aircraft propulsion system assembly may also include a second flexible linkage connecting the actuator to the outer cowl door.

The flexible linkage may be removably connected to at least one of the inner cowl door or the outer cowl door.

A portion of a bypass flowpath within the aircraft propulsion system may be arranged radially between the inner cowl door and the outer cowl door.

The aircraft propulsion system assembly may also include a nacelle outer structure and a nacelle inner structure. The nacelle outer structure may include the outer cowl door. The nacelle outer structure may be configured to house at least a fan case of the aircraft propulsion system. The nacelle inner structure may include the inner cowl door. The nacelle inner structure may be configured to house at least a core of the aircraft propulsion system.

The aircraft propulsion system assembly may also include a fixed structure and a second linkage. The second linkage may be configured to connect to and thereby link the inner cowl door and the fixed structure.

The second linkage may be configured as or otherwise include a flexible linkage and/or a rigid linkage.

The inner cowl door may be configured to engage the fixed structure when the inner cowl door is in a closed position.

The aircraft propulsion system assembly may also include an upper bifurcation structure. The fixed structure may be configured with the upper bifurcation structure.

The fixed structure may be configured as or otherwise include a support structure. The support structure may be arranged at a lower side of a core of the aircraft propulsion system.

The aircraft propulsion system assembly may also include a support structure.

The support structure may be arranged at a lower side of a core of the aircraft propulsion system. The flexible linkage may also be configured to connect to and thereby link the inner cowl door and the outer cowl door to the support structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
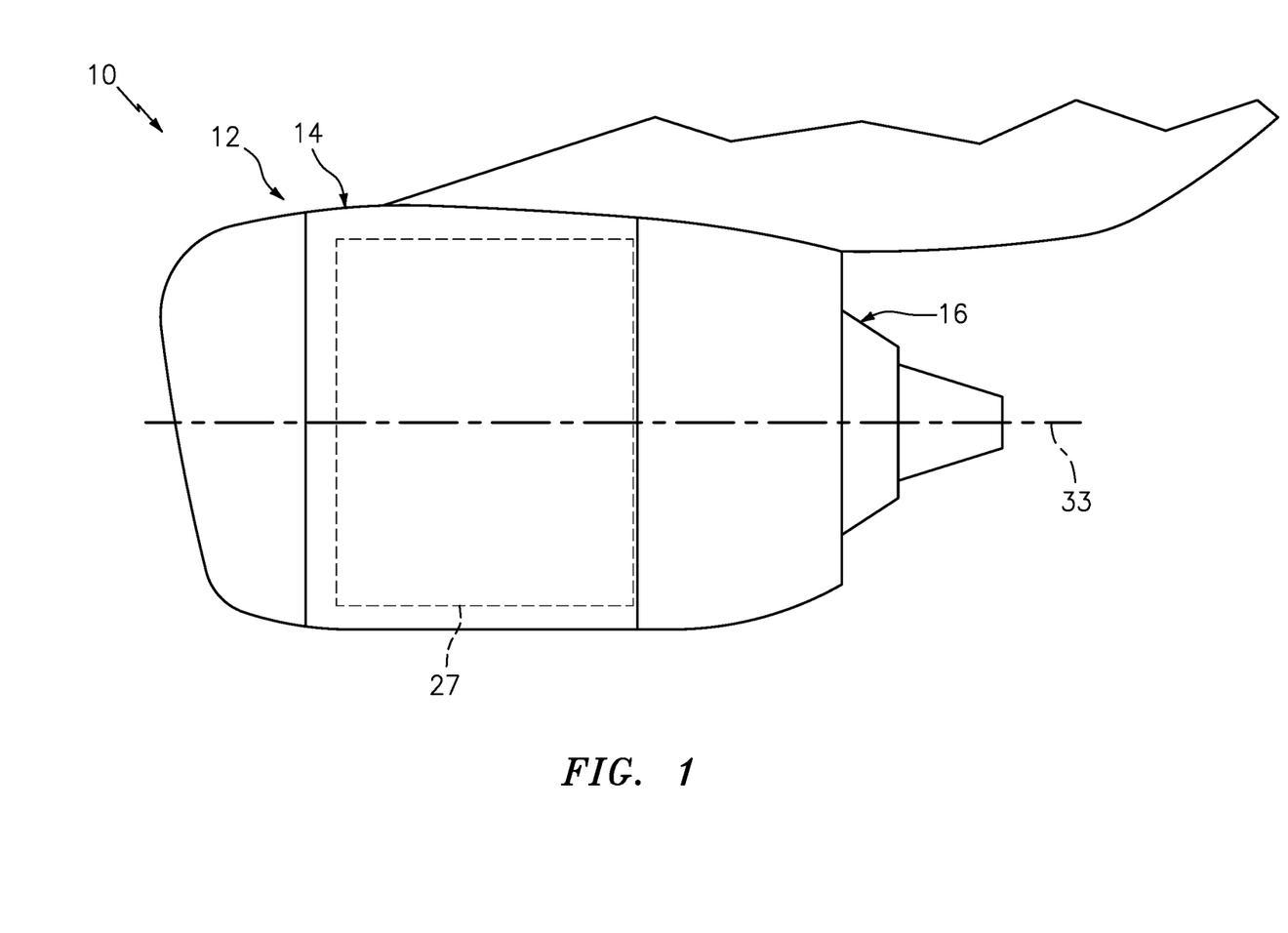
FIG. 1 is a side illustration of an aircraft propulsion system.

FIG. 1 illustrates an aircraft propulsion system 10 for an aircraft such as, but not limited to, a commercial airliner or a cargo plane. The propulsion system 10 includes a nacelle 12 and a gas turbine engine. This gas turbine engine may be configured as a high-bypass turbofan engine. Alternatively, the gas turbine engine may be configured as any other type of gas turbine engine capable of propelling the aircraft during flight.

The nacelle 12 is configured to house and provide an aerodynamic cover for the gas turbine engine. The nacelle 12 of FIG. 1 includes a nacelle outer structure 14 and a nacelle inner structure 16, which inner structure 16 may sometimes be referred to as an inner fixed structure (IFS).

Figure 2:
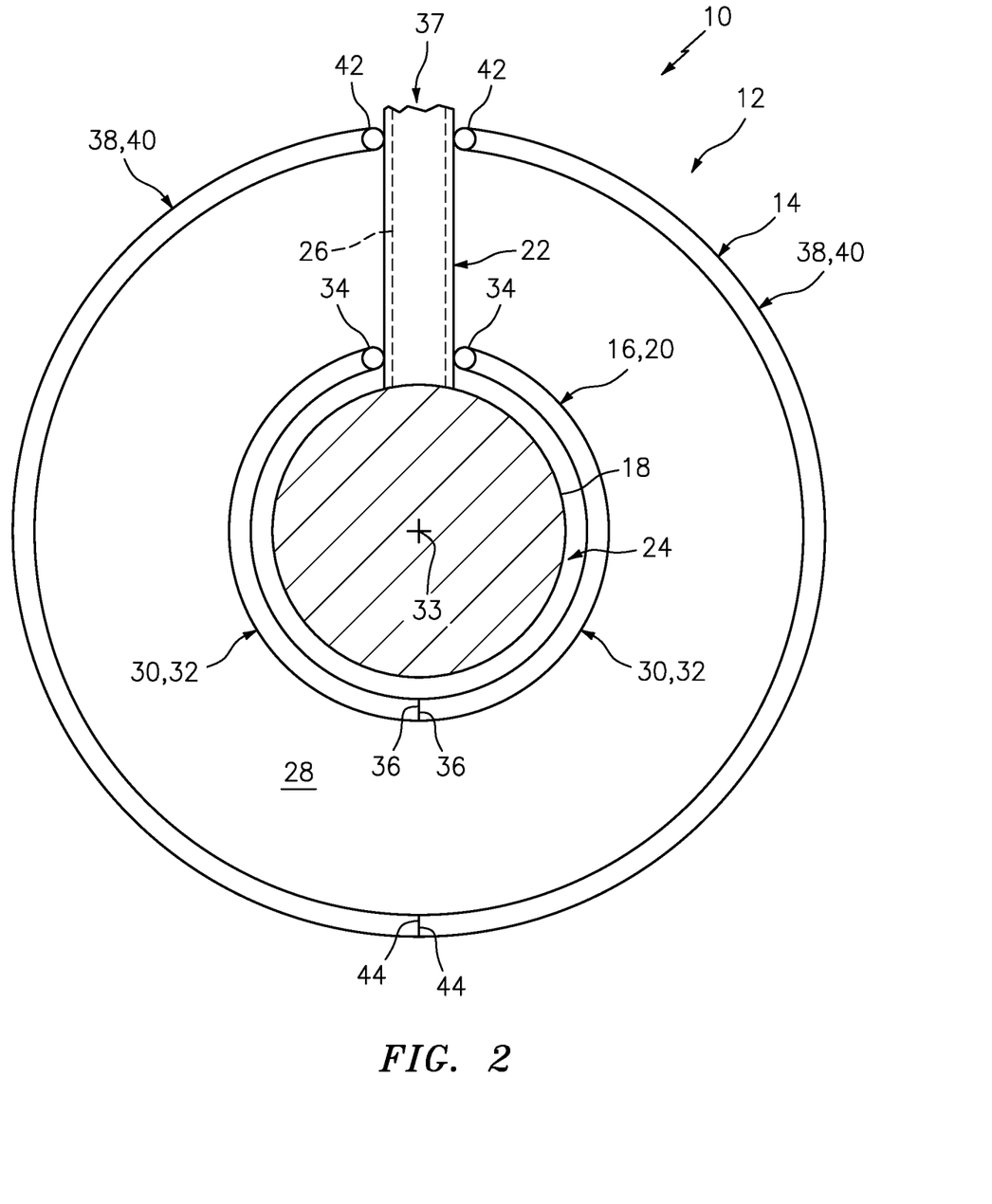
FIG. 2 is a cross-sectional illustration of a portion of the aircraft propulsion system with its doors in a closed position.

Referring to FIG. 2, the inner structure 16 covers and/or otherwise houses a core 18 of the gas turbine engine, which engine core 18 may include a compressor section, a combustor section and a turbine section. The inner structure 16 includes an inner barrel 20 (e.g., a core cowl) and at least one bifurcation structure 22; e.g., an upper bifurcation cowl. The inner barrel 20 may be a generally cylindrical/barrel-shaped cowl that extends circumferentially around and axially along the engine core 18. The inner barrel 20 at least partially forms an internal compartment 24 (e.g., a core compartment) within the nacelle 12. This internal compartment 24 at least partially or completely houses the engine core 18; e.g., the engine core 18 is arranged within the internal compartment 24. The bifurcation structure 22 provides an aerodynamic housing for a pylon 26 which mounts the aircraft propulsion system 10 to the aircraft. The bifurcation structure 22 extends radially between the inner barrel 20 and the outer structure 14.

The outer structure 14 covers a fan section (e.g., see fan case 27 in FIG. 1) of the gas turbine engine. The outer structure 14 covers at least a forward portion of the inner structure 16 and its inner barrel 20 so as to form a bypass duct and an associated bypass flowpath 28 radially between the structures 14 and 16. The outer structure 14 may also be configured with a thrust reverser for redirecting airflow from the bypass flowpath 28 out of the nacelle 12 in an axially forward and/or radially outward direction. The present disclosure, however, is not limited to the foregoing exemplary general nacelle configuration.

Briefly, the bypass duct of FIG. 2 is configured as an O-Duct. The term "O-duct" may describe a duct through which only a single bifurcation extends between and connects a nacelle outer structure and a nacelle inner structure. By contrast, the term "C-Duct" or "D-duct" may describe a duct through which two bifurcations (e.g., an upper bifurcation and a lower bifurcation) extend between and connect a nacelle outer structure and a nacelle inner structure. Of course, although the exemplary duct shown in FIG. 2 is an O-duct, the present disclosure is not limited to any particular duct configurations. In particular, the present disclosure also contemplates the nacelle 12 having a C-duct or a D-duct.

Figure 3:
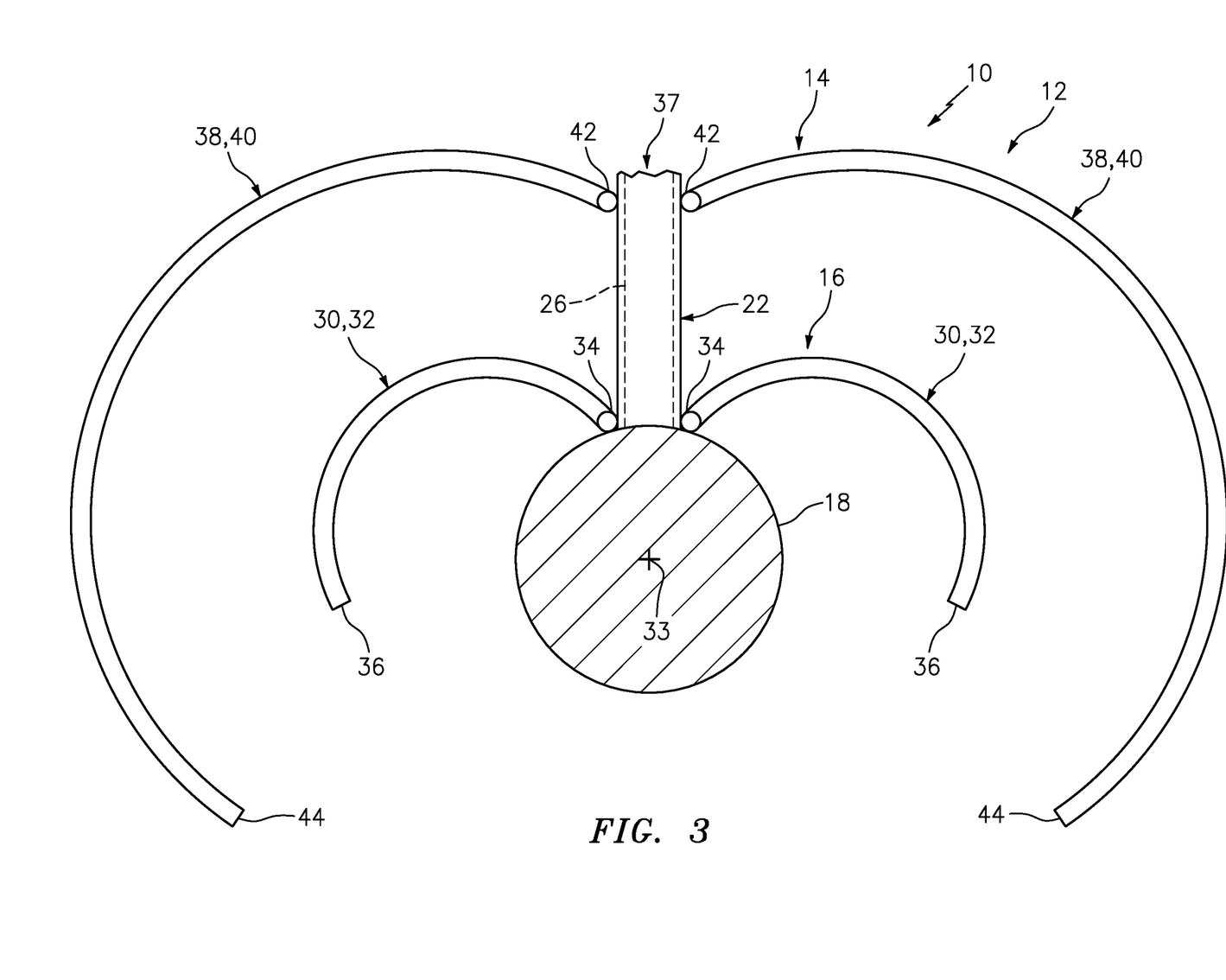
FIG. 3 is a cross-sectional illustration of a portion of the aircraft propulsion system with its doors in an open position.

Referring still to FIG. 2, the inner structure 16 may be configured with one or more movable (e.g., pivotable) inner structure components 30; e.g., doors. These inner structure components 30 may be configured as or otherwise include inner cowl doors 32. Each of these inner cowl doors 32 extends circumferentially about a centerline 33 of the gas turbine engine and its engine core 18. In particular, each inner cowl door 32 extends circumferentially between an inner cowl upper end 34 and an inner cowl lower end 36. The inner cowl upper end 34 may be pivotally connected to a fixed structure 37 (e.g., the bifurcation structure 22 and/or the pylon 26) by, for example, one or more hinges. Each inner cowl door 32 is thereby operable to move (e.g., pivot) between a closed position (position of FIG. 2) and an open position (position of FIG. 3). Referring to FIG. 2, the inner cowl lower ends 36 of the inner cowl doors 32 may be configured to latch together so as to at least partially or completely form the inner barrel 20.

The outer structure 14 may be configured with one or more movable (e.g., pivotable) outer structure components 38. These outer structure components 38 may be configured as or otherwise include outer cowl doors 40. Each of these outer cowl doors 40 extends circumferentially about the centerline 33. In particular, each outer cowl door 40 extends circumferentially between an outer cowl upper end 42 and an outer cowl lower end 44. The outer cowl upper end 42 may be pivotally connected to the fixed structure 37 (e.g., the bifurcation structure 22 and/or the pylon 26) by, for example, one or more hinges. Each outer cowl door 40 is thereby operable to move (e.g., pivot) between a closed position (position of FIG. 2) and an open position (position of FIG. 3). Referring to FIG. 2, the outer cowl lower ends 44 of the outer cowl doors 40 may be configured to latch together so as to at least partially or completely form, for example, a translatable sleeve of the outer structure 14.

Figure 4:
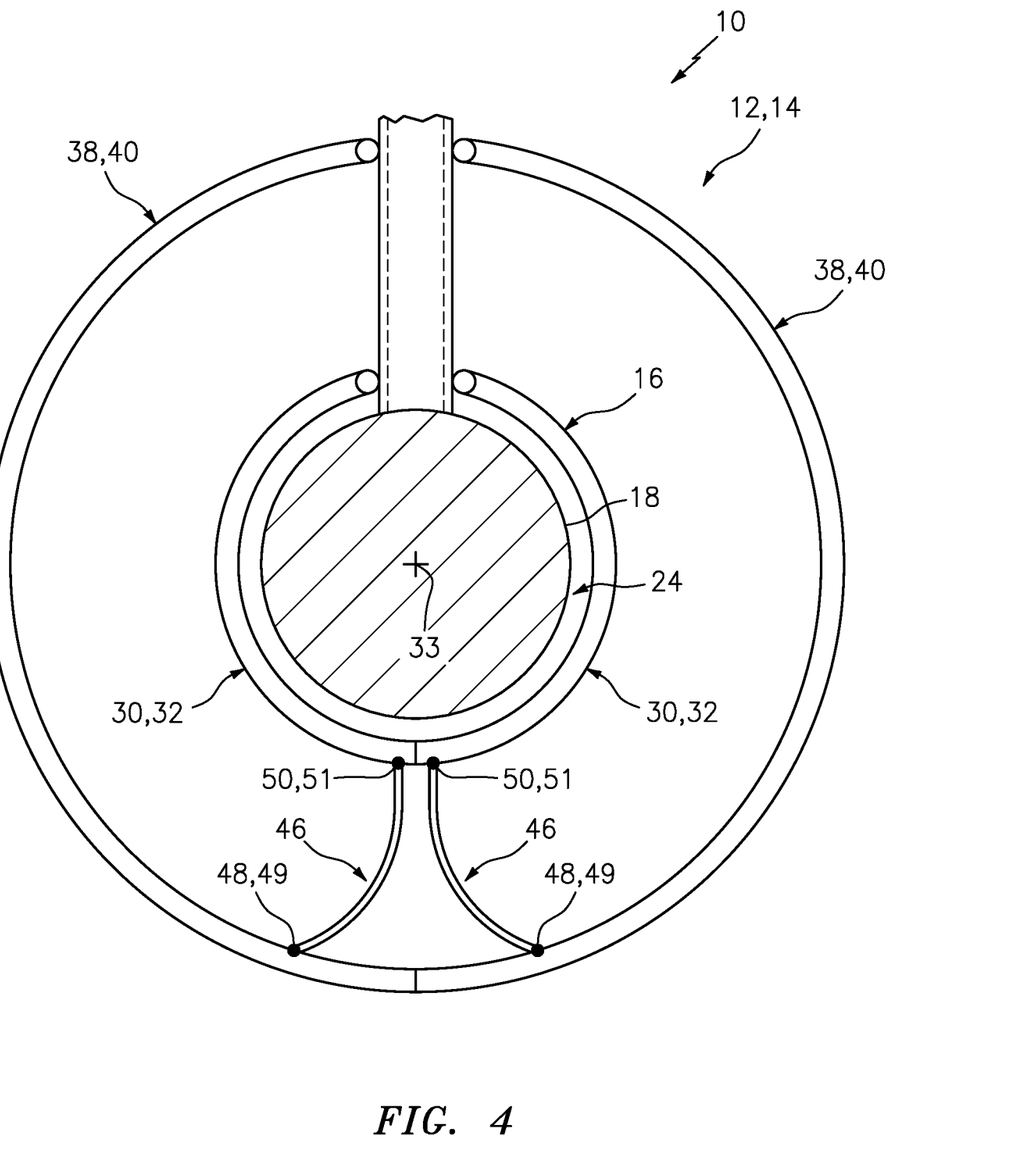
FIG. 4 is a cross-sectional illustration of the aircraft propulsion system portion of FIG. 2 configured with one or more linkages.
Figure 5:
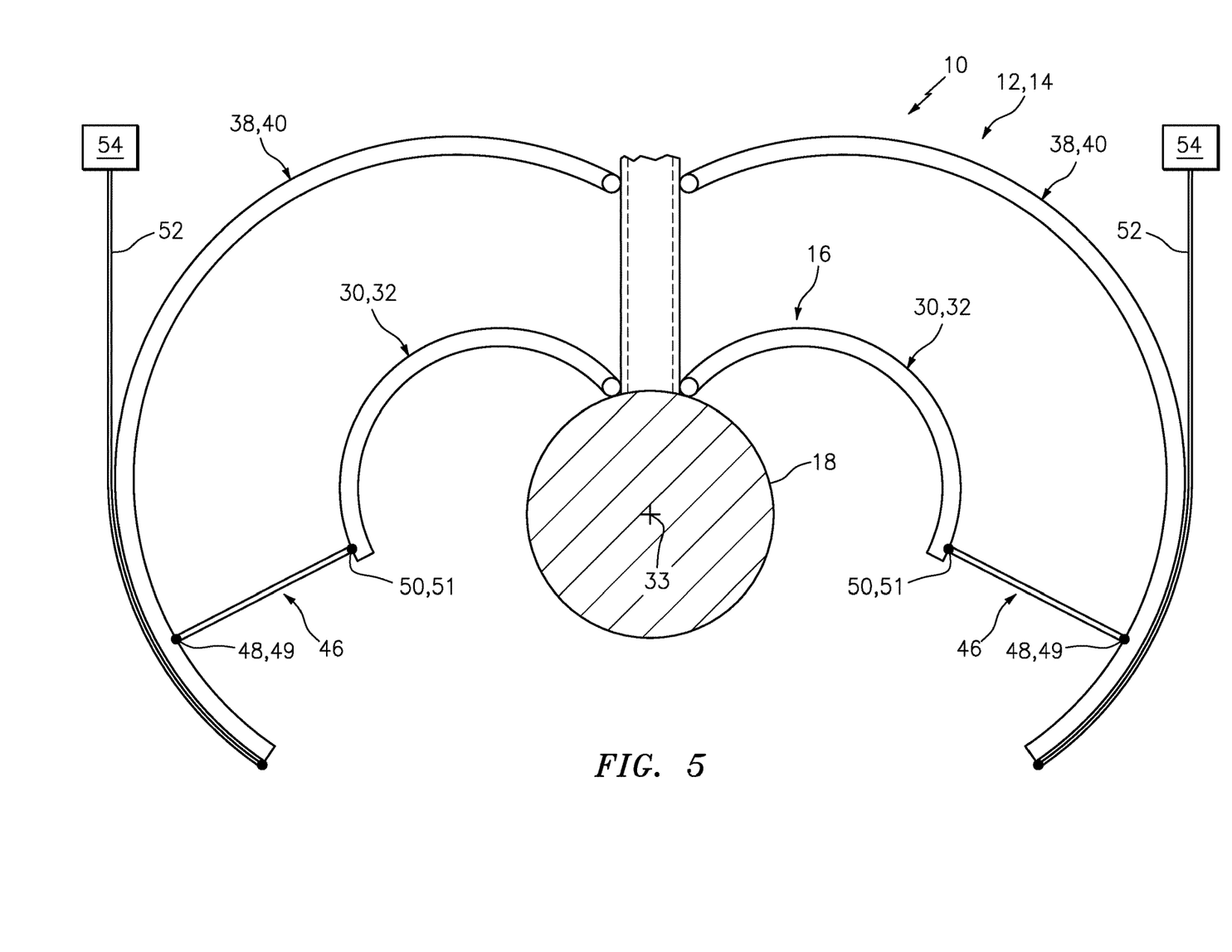
FIG. 5 is a cross-sectional illustration of the aircraft propulsion system portion of FIG. 3 configured with one or more linkages.

Referring to FIGS. 4 and 5, to assist and/or otherwise facilitate in the opening of and/or the closing of and/or the holding of the components 30 (e.g., the cowl doors 32), the nacelle 12 may be configured with one or more linkages 46. Each of these linkages 46 is arranged between and connected to a respective one of the outer structure components 38 (e.g., outer cowl doors 40) and a respective one of the inner structure components 30 (e.g., inner cowl doors 32). An outer end 48 of each linkage 46 of FIGS. 4 and 5, for example, is connected to the respective outer cowl door 40 at an outer point 49. An inner end 50 of each linkage 46 of FIGS. 4 and 5 is connected to the respective inner cowl door 32 at an inner point 51. Each linkage 46 extends (e.g., radially) between and thereby links the respective outer cowl door 40 and the respective inner cowl door 32.

Each linkage 46 is configured to link movement (e.g., pivoting) of the respective outer structure component 38 (e.g., outer cowl door 40) and the respective inner structure component 30 (e.g., inner cowl door 32). For example, if the outer cowl doors 40 are pulled or otherwise caused to open (e.g., via one or more additional linkages 52 (e.g., straps) connected to one or more respective actuators 54), then the linkages 46 will pull the inner cowl doors 32 open (e.g., concurrently) with the outer cowl doors 40.

Each linkage 46 may be configured as a flexible linkage; e.g., a flexible tether. Each linkage 46, for example, may be constructed from or otherwise include a flexible material such as, but not limited to, fabric (e.g., woven or braided fabric/strands). In one specific embodiment, each linkage 46 is configured as or otherwise includes a strap; e.g., a fabric strap. In another embodiment, one or each linkage 46 may be configured as or otherwise include a rope, a cable and/or a chain.

In the specific embodiments of FIG. 4, a longitudinal length of each linkage 46 (e.g., strap) is greater than a distance between the inner point 51 and the outer point 49 when, for example, the cowl doors 32 and 40 are closed and/or the cowl doors 40 are partially closed. This size differential may configure each linkage 46 as a lost motion device. For example, while slack in each linkage 46 (e.g., strap) is being taken out, the outer cowl doors 40 may be opened to a partially open position where the linkages 46 become taught. Before this partially open position, the linkages 46 do not cause the inner cowl doors 32 to open; e.g., the linkages 46 do not pull against the inner cowl doors 32. However, once the linkages 46 become taught at the partially open position, the linkages 46 are operable to pull the inner cowl doors 32 open as the outer cowl doors 40 continue to open. Thus, the linkages 46 are configured to delay motion (e.g., pivoting) of the inner cowl doors 32 relative to motion (e.g., pivoting) of the outer cowl doors 40.

In some embodiments, one or each linkage 46 may be removably mounted with one or each of the cowl doors 32, 40 such that those linkages 46 are removed (or stowed) before turbine engine operation. Thus, the linkages 46 may be installed (or deployed) only for turbine engine maintenance and/or inspection. Of course, in other embodiments, one or each linkage 46 may be permanently mounted with the cowl doors 32, 40. In other words, the linkages 46 may remain mounted with the cowl doors 32, 40 during turbine engine operation.

Figure 6:
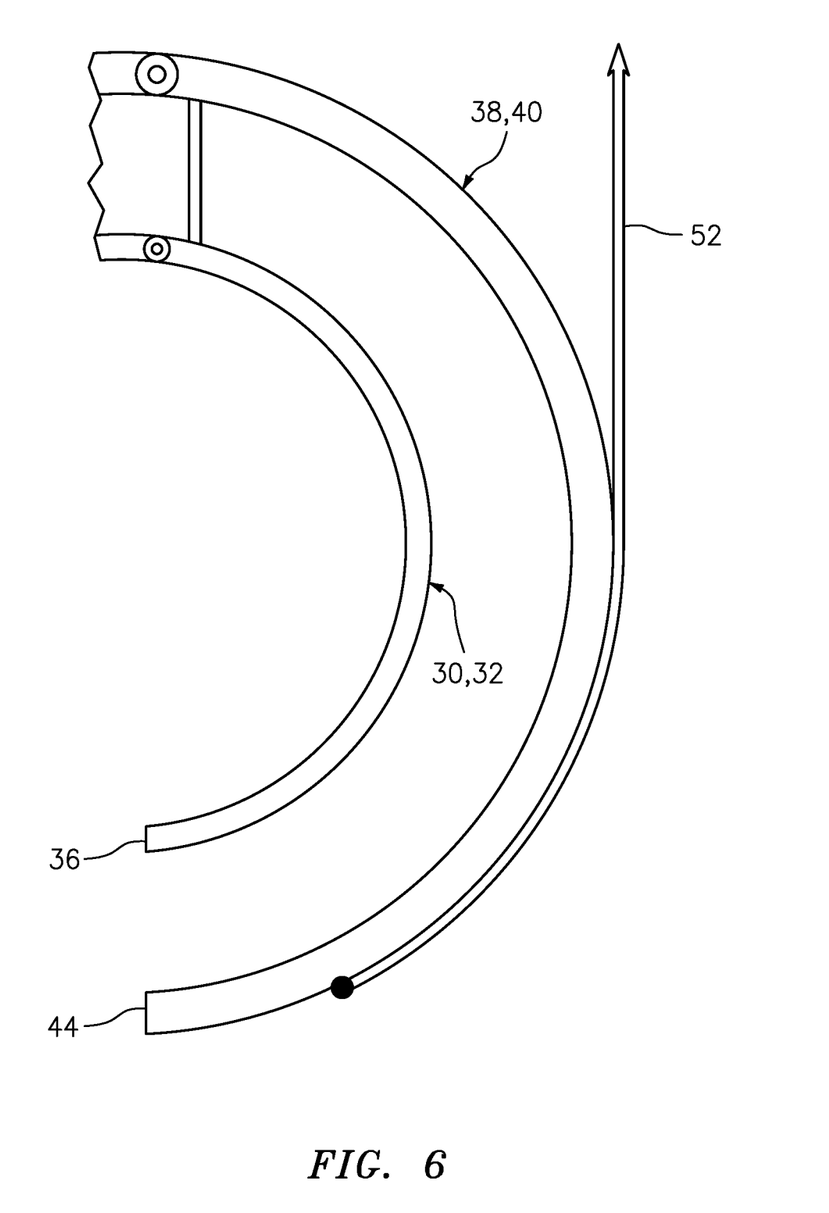
FIGS. 6-8 illustrate a sequence for moving the doors on at least one side of the aircraft propulsion system from the close position to the open position.
Figure 7:
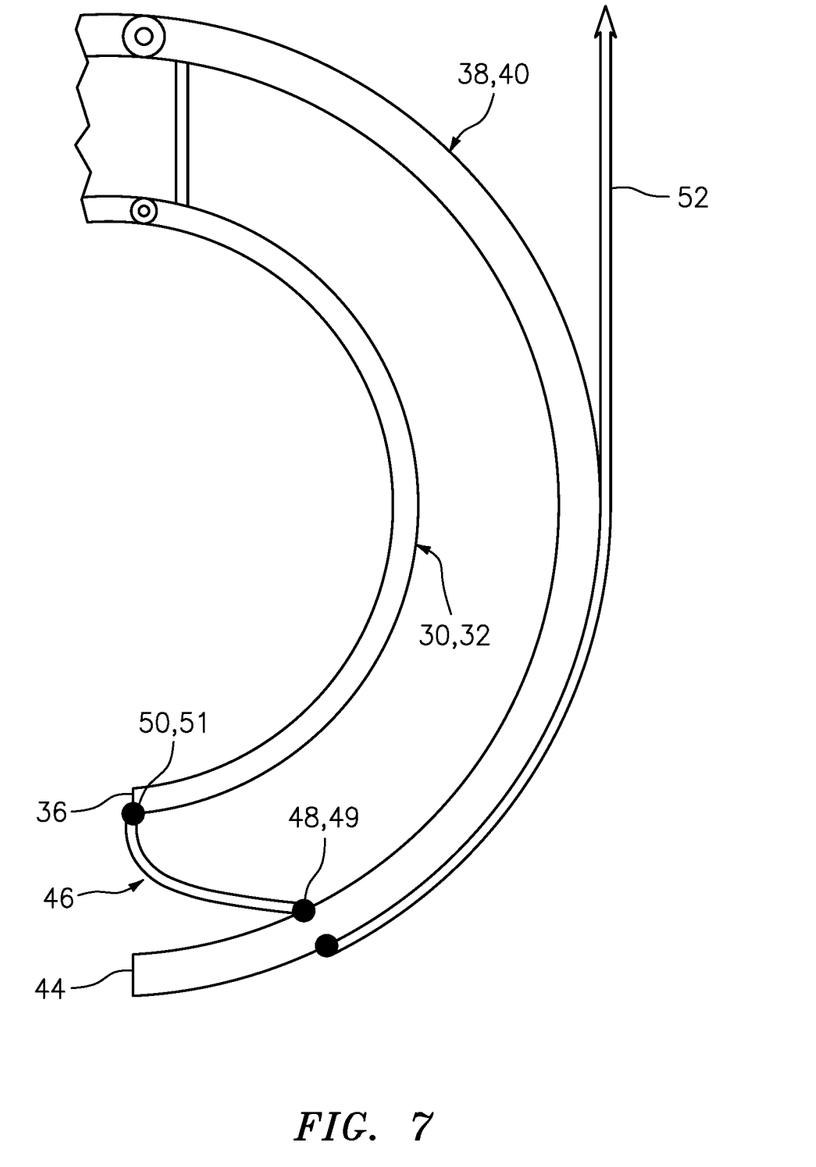
Figure 8:
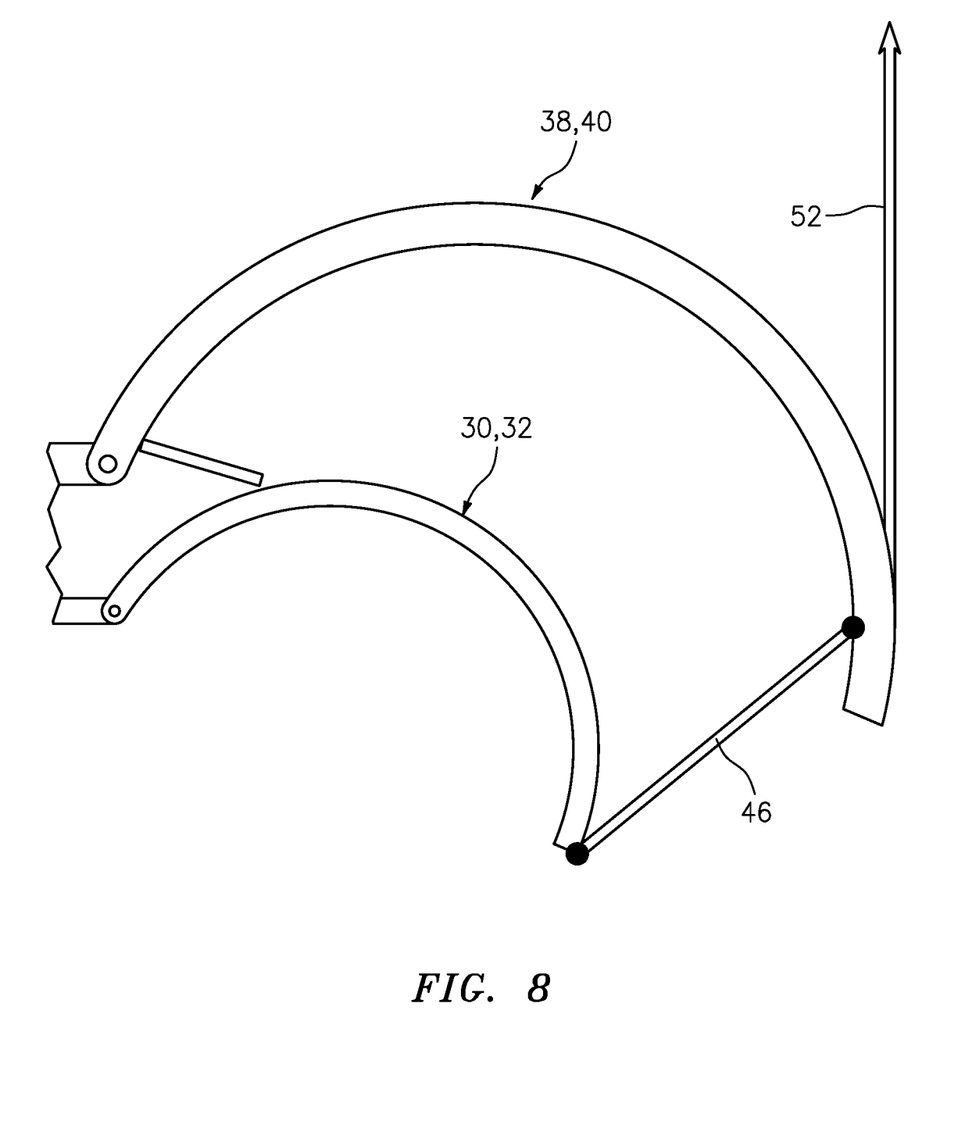

FIGS. 6-8 illustrate a sequence for opening the components 30 and 38; e.g., the cowl doors 32 and 40. During this sequence, the outer cowl doors 40 are unlatched. The additional linkages 52 are connected to the outer cowl doors 40 (see FIG. 6). The additional linkages 52 are pulled (e.g., via the respective actuators 54 of FIG. 5) to move the outer cowl doors 40 to a partially opened position (see FIG. 7). In this partially opened position, the inner cowl doors 32 are unlatched. The linkages 46 may be subsequently attached to the inner cowl doors 32 and the outer cowl doors 40. The additional linkages 52 are thereafter further pulled to move the outer cowl doors 40 to the opened position (see FIG. 8). During this further opening, the slack in the linkages 46 is pulled out and the linkages 46 thereafter cause the inner cowl doors 32 to move with the outer cowl doors 40. To close the cowl doors 32 and 40, the foregoing process may be reversed.

Figure 9:
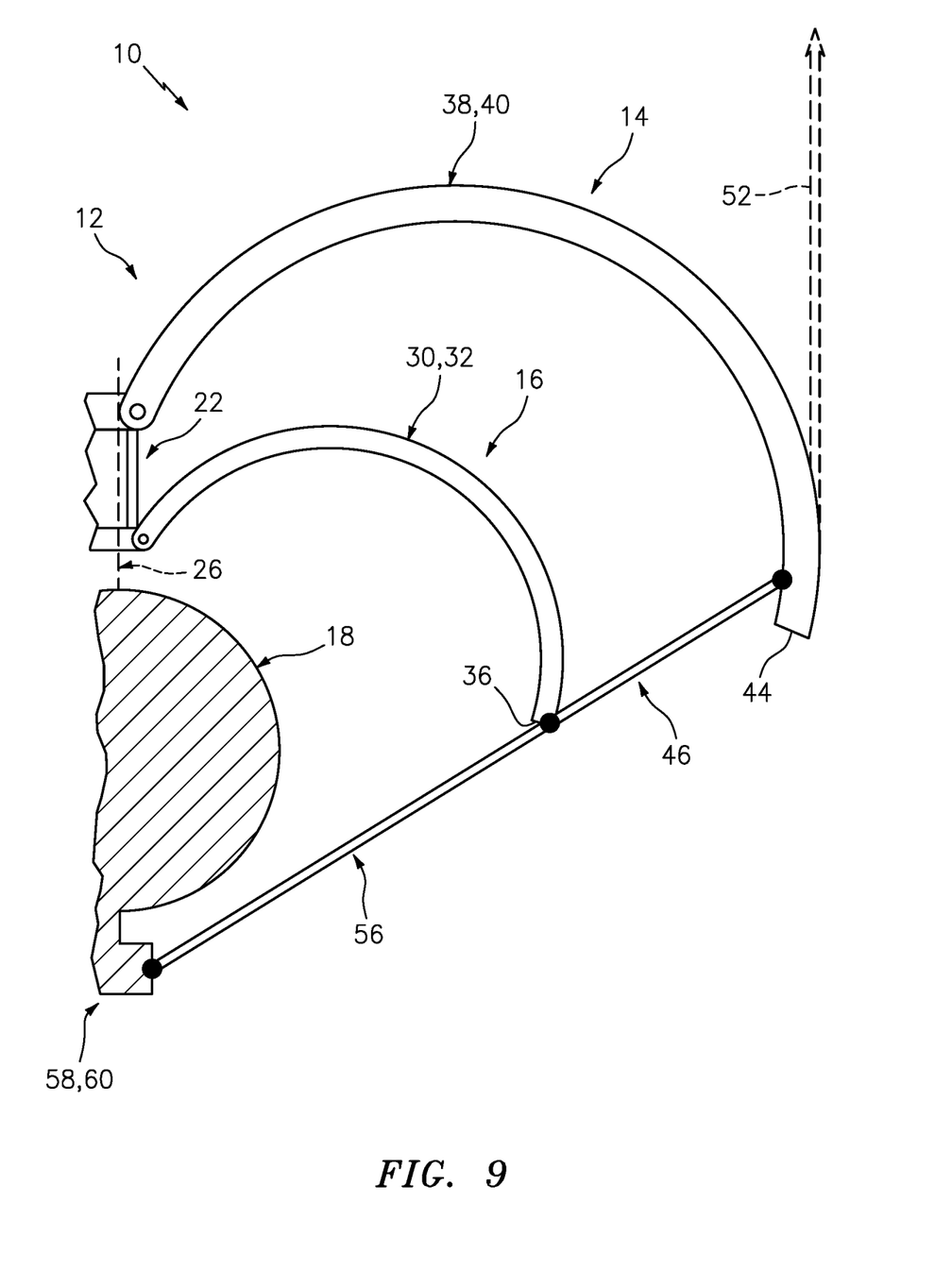
FIG. 9 is a cross-sectional illustration of a side portion of the aircraft propulsion system of FIG. 5 with a support linkage.

During certain conditions, a large wind gust may be capable of moving (e.g., pivoting) one or more of the components 30, 38 (e.g., the cowl doors 32, 40) when they are open. A large wind gust, for example, may blow/force one or more of the cowl doors 32 and/or 40 further open and/or overextend. To limit or prevent such movement of the component(s) 30 and/or 38 as well as to structurally support the nacelle 12 and its components during such (e.g., wind) loading, the nacelle 12 of FIG. 9 is configured with one or more additional linkages 56; e.g., stabilization and/or support linkages. By providing these linkages 56, otherwise required nacelle reinforcement structure(s) may be omitted thereby decreasing the weight of the nacelle 12.

Figure 10:
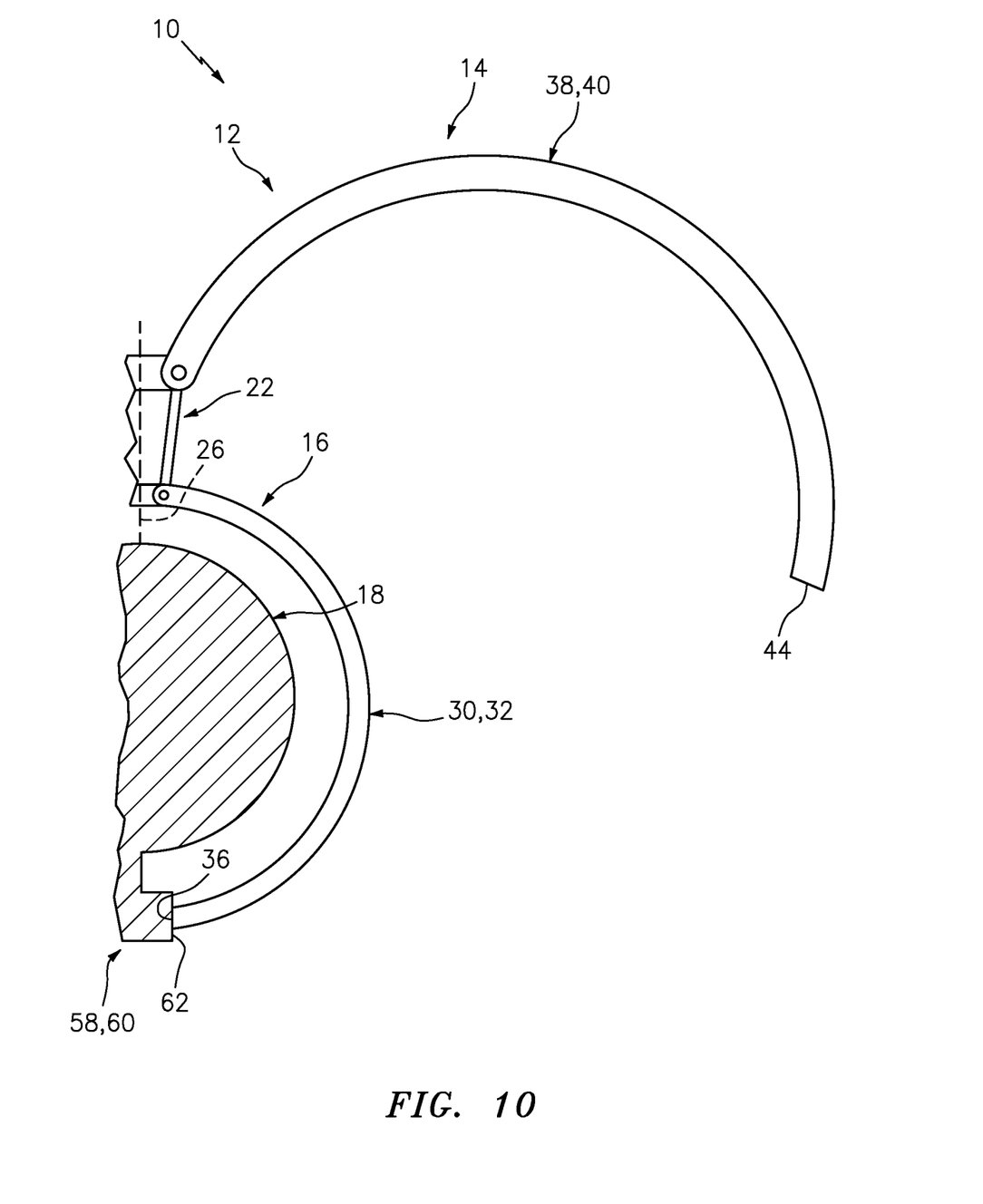
FIG. 10 is a cross-sectional illustration of a side portion of the aircraft propulsion system with its inner door closed and its outer door open.

Each linkage 56 of FIG. 9 is connected to a respective one of the inner structure components 30 (e.g., inner cowl doors 32) and a (e.g., lower) fixed structure 58. The term "fixed structure" may describe a structure that is stationary while configured with the aircraft propulsion system 10; e.g., the nacelle 12. Of course, while the fixed structure 58 may be a permanent stationary component in the aircraft propulsion system 10 (e.g., see FIGS. 9 and 10), the fixed structure 58 may alternatively be a temporary stationary component that is installed, for example, for maintenance and removed thereafter (e.g., see FIG. 13).

In the specific embodiment of FIG. 9, the fixed structure 58 is configured as a support structure 60; e.g., an engine support and/or a cowl door support. This support structure 60 may be positioned opposite (e.g., diametrically opposed) the bifurcation structure 22/the pylon 26. For example, where the pylon 26 is mounted to or otherwise arranged at (e.g., on, adjacent or proximate) a gravitational top/upper side of the gas turbine engine, the support structure 60 may be mounted to or otherwise arranged at (e.g., on, adjacent or proximate) a gravitational bottom/lower side of the gas turbine engine; e.g., a case of the engine core 18. The support structure 60 may be configured to provide support for the inner structure components 30 (e.g., inner cowl doors 32) when those components 30 are in their closed positions; e.g., see FIG. 10. Each inner cowl lower end 36, for example, may engage (e.g., abut against) a respective side 62 of the support structure 60. Each inner cowl door 32 may also be latched to the support structure 60 when that door 32 is in the closed position. The present disclosure, however, is not limited to the foregoing exemplary fixed structure 58 configuration. For example, in other embodiments, the fixed structure 58 may alternatively be configured as another structure (e.g., connection and/or fixture) positioned, for example, below and/or otherwise with (e.g., to the side of) the gas turbine engine. The fixed structure 58, for example, may also or alternatively be configured as or otherwise include a pad eye, a shackle and/or any other type of attachment connected to and/or positioned beneath or otherwise with the gas turbine engine.

Referring again to FIG. 9, each linkage 56 may be configured as a flexible linkage; e.g., a flexible tether. Each linkage 56, for example, may be constructed from or otherwise include a flexible material such as, but not limited to, fabric (e.g., woven or braided fabric/strands). In one specific embodiment, each linkage 56 is configured as or otherwise includes a strap; e.g., a fabric strap. In another embodiment, one or more or each linkage 56 may be configured as or otherwise include a rope, a cable and/or a chain.

In some embodiments, corresponding linkages 46 and 56 (e.g., linkages 46 and 56 on the same side of the aircraft propulsion system 10) may be configured as discrete and/or severable linkages (e.g., bodies). In other embodiments, corresponding linkages 46 and 56 may be removably attached together to form an extended single linkage. In still other embodiments, corresponding linkages 46 and 56 may be integral with one another; e.g., formed as a single body.

Figure 11:
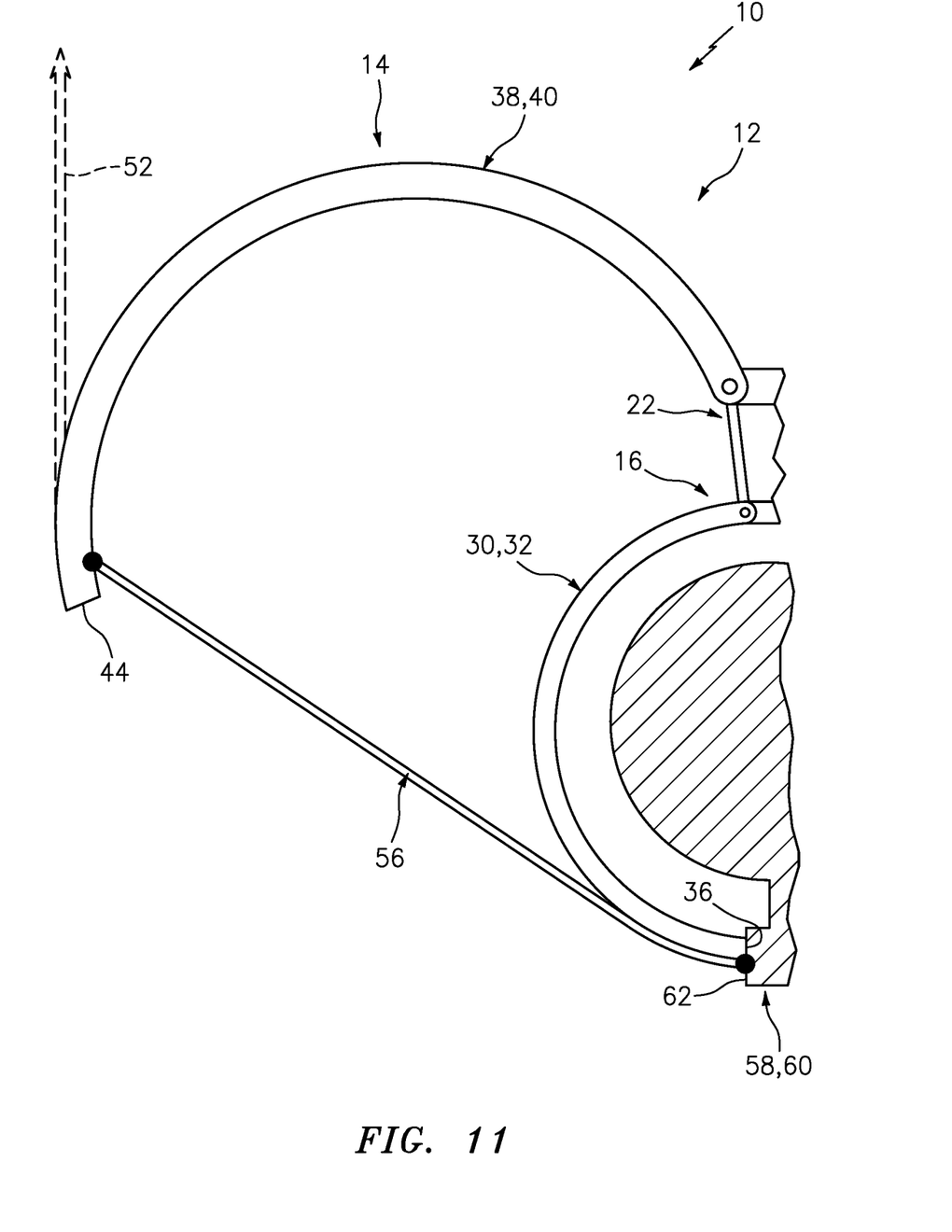
FIG. 11 is a cross-sectional illustration of a side portion of the aircraft propulsion system with its inner door closed and its outer door open and configured with a support linkage.
Figure 12:
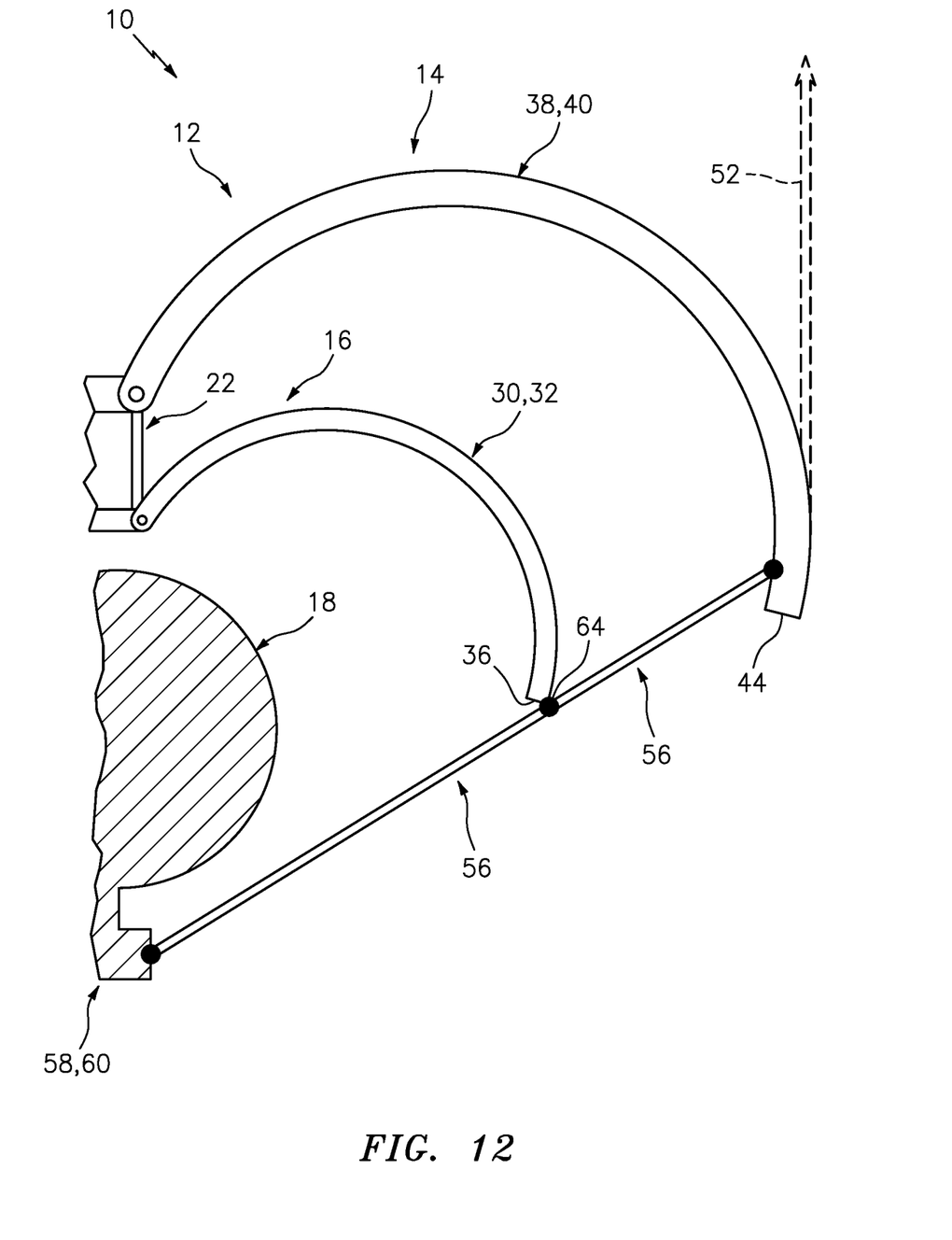
FIG. 12 is a cross-sectional illustration of a side portion of the aircraft propulsion system of FIG. 5 with a single linkage.

In some embodiments, referring to FIG. 11, each linkage 56 may be connected to and extend between a respective one of the outer structure components 38 (e.g., outer cowl doors 40) and the fixed structure 58. In such embodiments, the outer cowl door(s) 40 may be opened without also opening the inner cowl door(s) 32 as previously described. However, if the inner cowl door(s) 32 are later opened, each door 32 may (or may not) be respectively connected to the linkage 56 at, for example, an intermediate point 64 on the linkage 56 as shown in FIG. 12.

Figure 13:
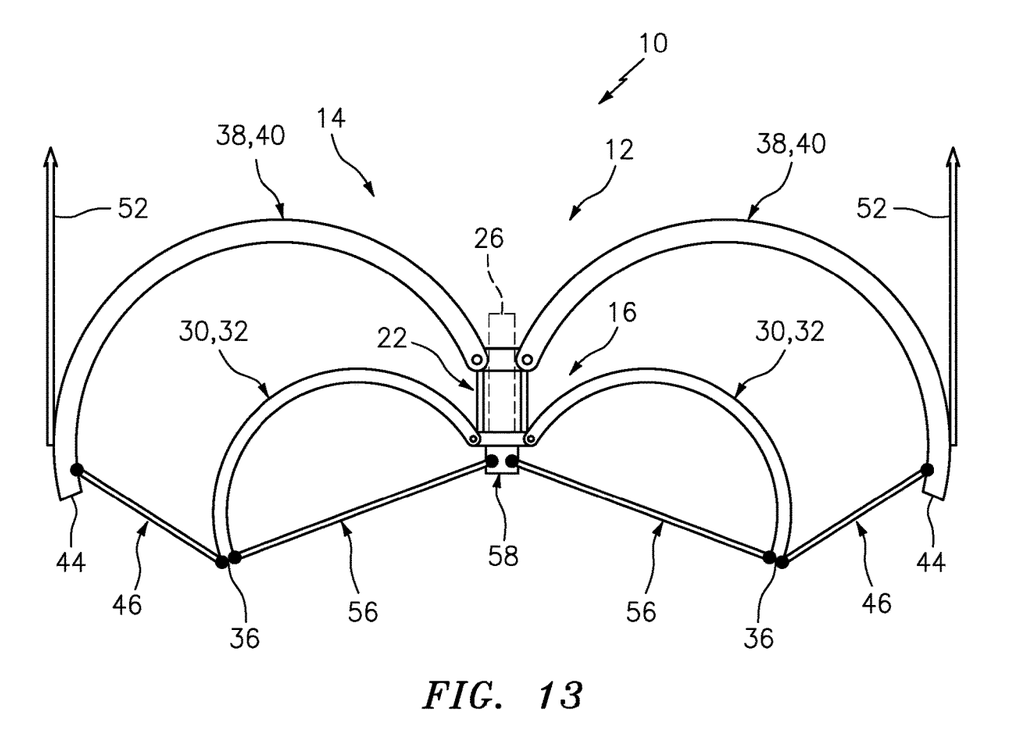
FIG. 13 is a cross-sectional illustration of the aircraft propulsion system portion of FIG. 5 configured with multiple linkages and with its gas turbine engine removed.

In some embodiments, referring to FIG. 13, the fixed structure 58 may alternatively be configured with nacelle inner structure 16; e.g., configured with the bifurcation structure 22 and/or the inner barrel 20. The fixed structure 58, for example, may be configured as a part of or otherwise (directly or indirectly) mounted to nacelle inner structure 16 and/or the pylon 26. In some embodiments, the fixed structure 58 may be configured as a linkage mount, which mount is (e.g., only) configured with the nacelle 12 when, for example, the gas turbine engine is removed from the aircraft propulsion system 10 as shown in FIG. 13. In other embodiments, the fixed structure 58 may be configured as another device (e.g., an engine mount) which remains with the aircraft propulsion system 10 during, for example, both aircraft propulsion system maintenance and operation.

In some embodiments, one or more or each of the linkages 46 and/or 56 in any one of the foregoing embodiments may each alternatively be configured as (or may additionally include) a rigid linkage. Each linkage 46 and/or 56, for example, may be configured as a fixed length (or variable length) strut or rod.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
an inner cowl door;
an outer cowl door radially outboard of and overlapping the inner cowl door; and
a flexible linkage configured to connect to and thereby link the inner cowl door and the outer cowl door, the flexible linkage configured as a flexible tether.

2. The assembly of claim 1, wherein the flexible tether comprises a strap.

3. The assembly of claim 1, wherein the flexible tether comprises fabric.

4. The assembly of claim 1, further comprising:
an upper fixed structure;
the inner cowl door pivotally connected to the upper fixed structure; and
the outer cowl door pivotally connected to the upper fixed structure.

5. The assembly of claim 1, wherein the flexible linkage is configured to pull against and thereby open the inner cowl door as the outer cowl door is opened.

6. The assembly of claim 1, wherein
the flexible linkage is connected to the inner cowl door at an inner point;
the flexible linkage is connected to the outer cowl door at an outer point; and
a distance between the inner point and the outer point changes during at least a portion of movement of the outer cowl door between a closed position and an open position.

7. The assembly of claim 1, wherein the flexible linkage is configured to enable movement of the outer cowl door before movement of the inner cowl door.

8. The assembly of claim 1, further comprising an actuator configured to move the outer cowl door from a closed position to an open position.

9. The assembly of claim 8, further comprising a second flexible linkage connecting the actuator to the outer cowl door.

10. The assembly of claim 1, wherein the flexible linkage is removably connected to at least one of the inner cowl door or the outer cowl door.

11. The assembly of claim 1, wherein a portion of a bypass flowpath within the aircraft propulsion system is arranged radially between the inner cowl door and the outer cowl door.

12. The assembly of claim 1, further comprising:
a nacelle outer structure comprising the outer cowl door, the nacelle outer structure configured to house at least a fan case of the aircraft propulsion system; and
a nacelle inner structure comprising the inner cowl door, the nacelle inner structure configured to house at least a core of the aircraft propulsion system.

13. The assembly of claim 1, further comprising:
a fixed structure; and
a second linkage configured to connect to and thereby link the inner cowl door and the fixed structure.

14. The assembly of claim 13, wherein the inner cowl door is configured to engage the fixed structure when the inner cowl door is in a closed position.

15. The assembly of claim 1, further comprising:
a support structure arranged at a lower side of a core of the aircraft propulsion system;
the flexible linkage further configured to connect to and thereby link the inner cowl door and the outer cowl door to the support structure.

16. An assembly for an aircraft propulsion system, comprising:
an upper bifurcation structure;

a fixed structure configured with the upper bifurcation structure;

an inner cowl door;

an outer cowl door radially outboard of and overlapping the inner cowl door;

a flexible linkage configured to connect to and thereby link the inner cowl door and the outer cowl door; and a second linkage configured to connect to and thereby link the inner cowl door and the fixed structure.

17. An assembly for an aircraft propulsion system, comprising:

a fixed structure comprising a support structure arranged at a lower side of a core of the aircraft propulsion system;

an inner cowl door;

an outer cowl door radially outboard of and overlapping the inner cowl door;

a flexible linkage configured to connect to and thereby link the inner cowl door and the outer cowl door; and a second linkage configured to connect to and thereby link the inner cowl door and the fixed structure.

* * * * *